US007446728B2

(12) United States Patent
Li

(10) Patent No.: US 7,446,728 B2
(45) **Date of Patent: *Nov. 4, 2008**

(54) METHOD AND APPARATUS FOR CONSTRUCTING GENERAL WIRELESS ANTENNA SYSTEMS

(76) Inventor: Shidong Li, 1112 Millbrae Ave., Millbrae, CA (US) 94030

( * ) Notice: Subject to any disclaimer, the term of this patent is extended or adjusted under 35 U.S.C. 154(b) by 0 days.

This patent is subject to a terminal disclaimer.

(21) Appl. No.: 11/705,912

(22) Filed: Feb. 13, 2007

(65) Prior Publication Data

US 2007/0188378 A1 Aug. 16, 2007

Related U.S. Application Data

(60) Provisional application No. 60/772,909, filed on Feb. 13, 2006.

(51) Int. Cl.
*H01Q 21/00* (2006.01)
*H04B 17/00* (2006.01)

(52) U.S. Cl. .................... 343/853; 343/770; 455/115.1; 455/562.1; 342/368

(58) Field of Classification Search ....................... None
See application file for complete search history.

(56) References Cited

U.S. PATENT DOCUMENTS

| | | | | |
|---|---|---|---|---|
| 6,166,690 | A * | 12/2000 | Lin et al. | 342/383 |
| 6,584,302 | B1 * | 6/2003 | Hottinen et al. | 455/69 |
| 6,831,600 | B1 * | 12/2004 | Cherrette et al. | 342/373 |
| 6,911,954 | B2 * | 6/2005 | Li | 343/853 |
| 7,133,699 | B1 * | 11/2006 | Owechko et al. | 455/562.1 |
| 2002/0032015 | A1 * | 3/2002 | Kitakado et al. | 455/277.1 |
| 2003/0139202 | A1 * | 7/2003 | Doi et al. | 455/562 |
| 2006/0158374 | A1 * | 7/2006 | Rahamin et al. | 342/368 |

* cited by examiner

*Primary Examiner*—Trinh V Dinh

(57) ABSTRACT

An antenna system of any three dimension (3D) geometry and method for constructing said system with an array of basic antenna elements are described. An antenna system beam pattern is specified. The basic antenna element parameters including basic pattern and actual spacing location are measured. The measured parameterized array elements are injected in an exact array frame formula for any 3D array systems to form an array frame. Array calibration is performed by evaluating a dual frame to the array frame and the array control weights are determined based on the dual array frame and the specified system beam pattern. The antenna system and a software tool is then constructed in accordance with the antenna control weights. The present invention enables the high precision beam synthesis with high quality beams for array of any geometry. The present invention is capable of taking account various factors in antenna constructions together in a one-step approach. These factors include, for instance, mutual coupling, element spacing variation, element gain and basic pattern variation, antenna cable and feeds length variation (reflected in phase differences).

19 Claims, 13 Drawing Sheets

METHOD AND APPARATUS FOR CONSTRUCTING GENERAL WIRELESS ANTENNA SYSTEMS

CROSS-REFERENCES TO RELATED APPLICATIONS

This application is related to and claims the benefit of U.S. Provisional Patent Application 60/772,909, entitled "Methods and Apparatus for Constructing General Wireless Antenna Systems", filed on Feb. 13, 2006, which provisional application is incorporated in its entirety by reference into the present application.

FIELD OF INVENTION

This present invention generally relates to the construction of mobile and fixed link antenna systems with any array geometry. More particularly, this invention allows for the construction of array antenna systems with improved directivity, directive gain, and apertures and improved control over these quantities.

BACKGROUND OF THE INVENTION

Array antennas of different geometry/shapes are used in all wireless communication systems. An array antenna is typically constructed with a set of basic antenna elements arranged in an array. Such an array can often be linear—elements arranged in a line, can be planar, circular, cylindrical and spherical, etc. Depending on applications, each has their role in wireless communication applications.

Array beam pattern synthesis is to combine all elements in an array with complex weights so as to create beam patterns of the desired direction and shape. Effective synthesis and antenna construction has been studied for decades. There are many difficult factors that affect the effectiveness of an array antenna. For instance, mutual coupling among basic elements, element spacing variations in an array (which requires oftentimes high precision mechanical processes), element gain and basic pattern variations, array re-calibration (upon element failure in an array), and high quality beams.

Li has described a method and apparatus for constructing linear (including flat panel) wireless array antenna systems (U.S. Pat. No. 6,911,954 B2). The advantages include a beam synthesis method that incorporates all aforementioned factors into a one-step systematic approach. Mutual coupling, element spacing and gain variations, high quality beam can all be accounted for simultaneously. Array re-calibration (upon element failure detection) is also exceedingly easy in Li's method so that the array can still function in its maximum capacity as allowed by the physics exhibiting in the (remaining) array.

While Li's method is seen to bring in significant improvements to the construction of many useful array antenna systems, array antenna systems of other shapes, for instance, constructed over a cylindrical surface, a spherical surface, or any other three dimensional (3D) geometry (or General Wireless Array Antenna Systems) are still to be constructed in similar ways, taking advantages just as those in Li's method.

The construction of general wireless array antenna systems is considerably more complicated. Precise 3D beam synthesis has not been seen. Existing methods of construction of general array antennas are very limited. None has been able to incorporate aforementioned factors into the design simultaneously. Beam quality is also very restricted.

Thus, a better method for general array antenna constructions that provides better beam quality and directivity is needed, one that resolves the many factors in array beam synthesis, provides a precise 3D array synthesis, enables the array re-calibration and render existing construction method obsolete.

BRIEF SUMMARY OF THE INVENTION

The present invention is directed towards the above need—constructing array antennas with any array geometry. An antenna system in accordance with the present invention has improved directivity and directive gain and improved control over all array element parameters so that the best performance of the antenna system can be achieved.

A method in accordance with the present invention is a method for forming a beam for an antenna system that includes a plurality of antenna elements distributed over an arbitrary array geometry. The method includes specifying an antenna system radiation pattern function, determining element radiation pattern functions, determining the value of a set of spacing parameters, forming a frame from the element radiation pattern functions and the array geometry and finding a dual of the frame, and determining the element weight coefficients for the elements. The antenna system radiation pattern function describes the transmission or reception beam of the antenna system. The element radiation pattern functions each include a basic element pattern specification, a frequency of operation and at least one set of spacing parameters that specifies the location of the element in the antenna system. The frame that is formed from the element radiation pattern functions and geometrical relationship among elements arises from a condition, called the frame condition, imposed on the set of element radiation pattern functions and geometrical relationship among elements in an array. The element weight coefficient for each antenna element is based on the elements of a dual frame and the specified antenna system radiation pattern function. More particularly, the element weight coefficients result from the inner product of the dual frame with the specified antenna system radiation pattern function. The inner product is defined because of the frame condition imposed.

An apparatus in accordance with the present invention includes an antenna system and a software tool whose beam is formed by means of the method of the present invention.

One advantage of the present invention is that it enables the construction of array systems of any geometry precisely.

Another advantage of the present invention is that it can precisely include mutual coupling among elements into the description of each antenna element.

The other advantage is that non-uniform spacing of the elements is easily and precisely accommodated by the description of the antenna element pattern function.

Yet another advantage of the present invention is that real time re-calibration can be carried out if element gain changes or element failures or both are detected. This allows the array antenna to function at its best capacity allowable by the physics principle and allows mobile systems to function without having to replace or repair the antenna immediately.

Yet another advantage of the present invention is that computations involved in the method are quick so as to be suitable for re-calibration and reconfiguration of an antenna system after the system has been deployed.

Yet another advantage of the present invention is that element functions can include cable length variation, other circuit delays or other irregularities in the currents driving each array element.

BRIEF DESCRIPTION OF THE FIGURES

The mechanism and features, aspects and advantages of the present invention will become better understood with regard to the following description, appended claims, and accompanying drawings where:

DETAILED DESCRIPTION OF THE INVENTION

The present invention relates to a method for constructing an improved array antenna system built over any geometry configuration. The method of the present invention avoids many of the drawbacks and approximations of existing cell and other array antenna systems by a new and rigorous approach, namely a frame theoretical approach. In a typical array antenna construction, the type of element of an antenna array is known, and the basic element pattern is approximated based on a model of the element. However, combination of the elemental radiation pattern to achieve any desired radiation pattern for the antenna array is limited in accuracy and controllability because of many simplifying assumptions must be made to make the problem tractable. The simplification approximation/assumption is particularly necessary in cases where an array geometry is irregular. Some simplifying assumptions include the regular spacing of elements, the allowable spacing of elements, such as half-wavelength, simplified basic element pattern functions, and avoidance of unpredictable time delays among element.

The approach of the present invention makes none of these simplifying assumptions to compute from a given basic element pattern the best possible approximation to a given antenna system radiation function for the desired number of elements in a desired array geometry. The present invention allows the synthesized beam to function in its best capacity allowable by the array physics.

Figure 1:
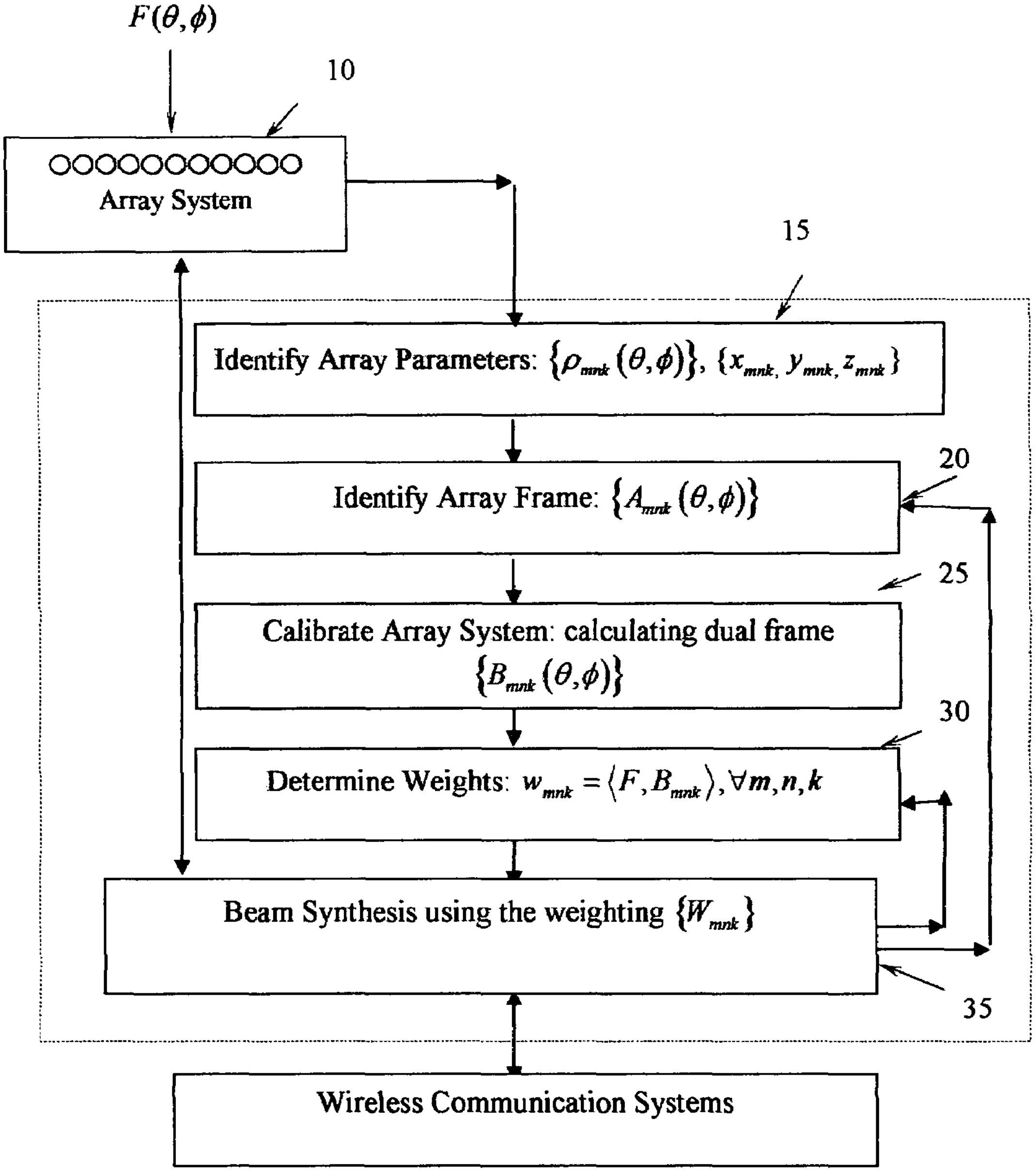
FIG. 1 shows a flow chart of the steps, in accordance with the present invention, for constructing a general array antenna system of any array geometry.

FIG. 1 is a flow chart of the steps, in accordance with the present invention, for the construction of an antenna system having a desired far-field radiation pattern $F(\theta, \phi)$ 10 to be transmitted or received by the antenna system, where $\theta, \phi$ are the elevation and horizontal/azimuth angles, respective. In the first step 15, the antenna array parameters are identified. The array element parameters include, at least, the element locations in a reference coordinate system $\{(x_{mnk}, y_{mnk}, z_{mnk})\}_{m,n,k}$, where $0 \leqq m \leqq M-1$, $0 \leqq n \leqq N-1$, $0 \leqq k \leqq K-1$, and MNK is the number of total elements in an array, and a basic element pattern $\rho_{mnk}(\theta, \phi)$ for each element indexed by m,n,k.

In step 20, the array element parameters are collected into a set of functions and identified as an array frame $\{A_{mnk}\}$ spanning a radiation function space X (a Hilbert space) in which the desired radiation pattern $F(\theta, \phi)$ is defined or to be generated. The general expression of $\{A_{mnk}\}$ will be described.

A sequence of vectors/functions $\{a_n\}$ in a Hilbert space H is a frame of H if there exist constants $0 < C \leqq D < \infty$ such that for all vectors/functions $f$ in H, $$C\|f\|^2 \le \sum_{n=0}^{N-1} |\langle f, a_n\rangle|^2 \le D\|f\|^2.$$

Given a frame $\{a_n\}$, there exists a dual frame $\{b_n\}$ such that for all f in H, we have $$f = \sum_{n=0}^{N-1} \langle f, b_n\rangle a_n = \sum_{n=0}^{N-1} \langle f, a_n\rangle b_n.$$

Therefore, in step 25, a dual frame $\{B_{mnk}\}$ is determined. With a dual frame known, the system radiation pattern function can be expressed in two ways based on the two forms of the frame expansion in the radiation function space X:

$$\forall\, F(\theta,\phi),\ F(\theta,\phi) = \sum_{m,n,k} \langle F(\theta,\phi), B_{mnk}\rangle A_{mnk} \tag{1.1}$$

$$\forall\, F(\theta,\phi),\ F(\theta,\phi) = \sum_{m,n,k} \langle F(\theta,\phi), A_{mnk}\rangle B_{mnk}. \tag{1.2}$$

The basic method of determine a dual frame $\{B_{mnk}\}$ is to put the array frame $\{A_{mnk}\}$ in a matrix A row-by-row for all each and every indices m,n,k. Note for each given set of m,n,k, $A_{mnk}$ is a matrix in two angles θ, φ, sampled in appropriate manners. One is to put this matrix $A_{mnk}$ row-by-row first into a row vector, and then put this vector in the matrix A. A has therefore total MNK rows of vectors. Once A is formed, a dual frame can be calculated by finding the pseudo-inverse of the matrix B. B shall now consist of MNK columns of vectors, the $i^{th}$ column corresponds to the $i^{th}$ row of matrix A.

Thus in step 30, with a dual frame $\{B_{mnk}\}$ determined, the array controlling weight coefficients (simply weights) $\{w_{mnk}\}$ are computed and used to synthesize the desired radiation pattern F(θ, φ) from the given element described by array frame functions $\{A_{mnk}\}$, that is $$w_{mnk} = \langle F(\theta,\phi), B_{mnk}\rangle \tag{1.3}$$

and the array antenna system can thereby be constructed is step 35.

In accordance with the present invention, the array weights generating a given radiation pattern F(θ, φ) are generally non-unique (when array element spacing is less than the relative half-wavelength, and/or when the number of elements is greater than the number of sampling points in the array beam pattern F(θ, φ). In such cases, there are infinite many dual frame functions $\{B_{mnk}\}$, given by the formula the inventor has derived in a previous research article. The selection of a dual $\{B_{mnk}\}$ can be made to minimize the cost and energy exciting the array system.

In the following description, an array frame construction is described in detail for an arbitrary three dimensional (3D) array system.

Array System of Any Geometry

Figure 2:
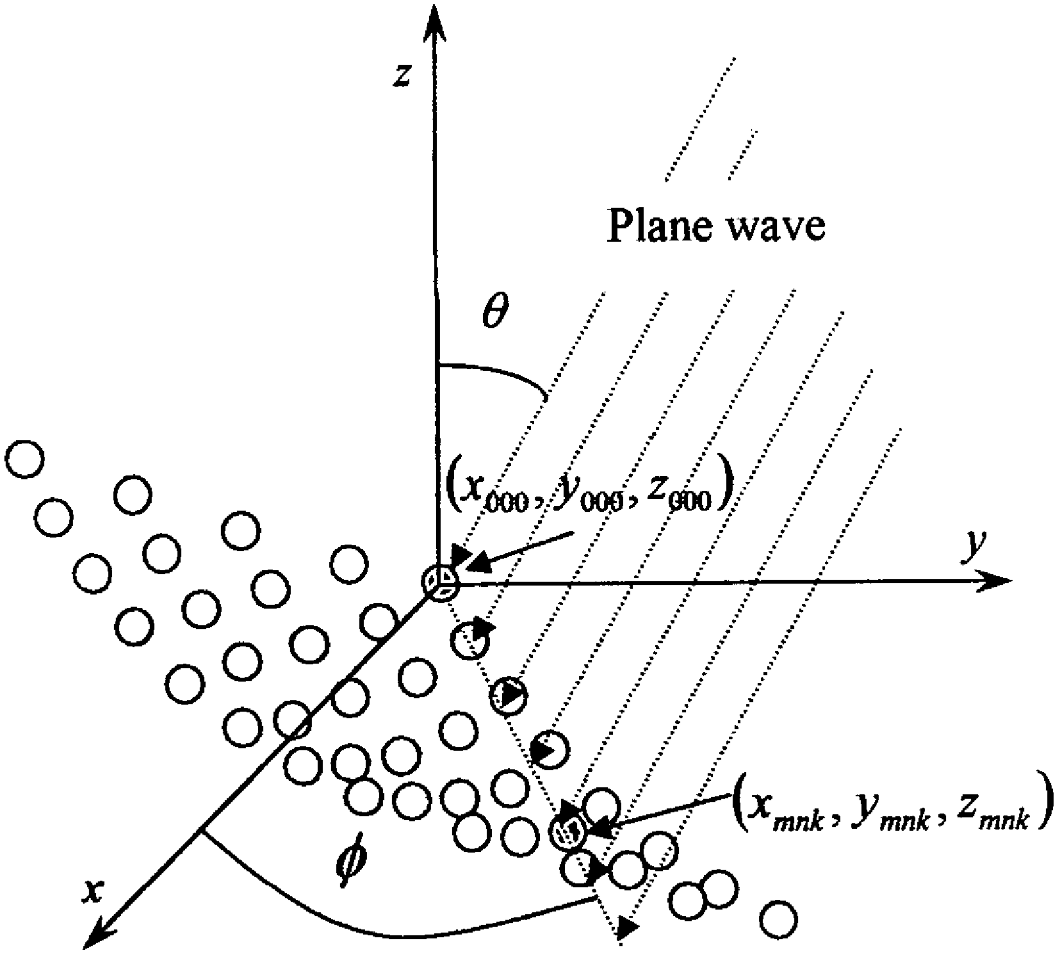
FIG. 2 shows a schematic description of an arbitrary 3D array system in the xyz-coordinate system and in relation to the horizontal and elevation angles.

As shown in FIG. 2, assume that the array elements are placed in a Cartesian System with location given by the coordinates $\{(x_{mnk}, y_{mnk}, z_{mnk})\}_{m,n,k}$, where $0 \leqq m \leqq M-1$, $0 \leqq n \leqq N-1$, $0 \leqq k \leqq K-1$, and MNK is the number of total elements in an array. The placement of these elements need not be on regular grids, nor on a flat plane. The array geometry can be of any shape pending on application.

Assume that the element at position $(x_{000}, y_{000}, z_{000})$ is our reference element to which all other elements are to refer to determine phase differences among antenna elements for a plane wave in the direction of (θ, φ). Here the plane wave directional parameters θ and φ are as indicated in FIG. 1. Since the element spacing are all relevant to the reference element, it is customary to assume that $x_{000}=0$, $y_{000}=0$, $z_{000}=0$. That is, the reference element is assumed to locate at the origin of the Cartesian coordinate system.

Assume also that the element basic pattern of the element at the location $(x_{mnk}, y_{mnk}, z_{mnk})$ is give by $\rho_{mnk}(\theta, \phi)$. Then the array frame for the 3D array system is given by $$\begin{aligned}\{A_{mnk}\} &= \left\{\rho_{mnk}(\theta,\phi)e^{\frac{2\pi}{\lambda}j(x_{mnk}\cos\phi\sin\theta + y_{mnk}\sin\phi\sin\theta + z_{mnk}\cos\theta)}\right\}_{m=0,n=0,k=0}^{M-1,N-1,K-1}, \\ &= \left\{\rho_{mnk}(\theta,\phi)e^{\frac{2\pi}{\lambda}j(x_{mnk}u + y_{mnk}v + z_{mnk}\cos\theta)}\right\}_{m=0,n=0,k=0}^{M-1,N-1,K-1}\end{aligned} \tag{1.4}$$

where λ is the wavelength of the operating frequency, j is the complex symbol, u=cos φ sin θ, v=sin φ sin θ are the direction cosines with which $u^2+v^2=\sin^2\theta \leqq 1$ and $\cos\theta=\sqrt{1-(u^2+v^2)}$, $-\pi/2 \leqq \theta \leqq \pi/2$. Note that we have assumed that $x_{000}=0$, $y_{000}=0$, $z_{000}=0$. Otherwise, parameters $x_{mnk}$, $y_{mnk}$, $z_{mnk}$ in formula (1.4) are to be replaced by $x_{mnk}-x_{000}$, $y_{mnk}-y_{000}$, $z_{mnk}-z_{000}$, respectively.

The steps involved to construct a 3D antenna system include placing elements in an desired 3D formation/geometry with any non-uniform spacing (roughly around half-wavelength or smaller) as desired; measuring, modeling or specifying the basic element patterns $\rho_{mnk}(\theta, \phi)$; measuring the element phase differences based on the cables connected to the elements and their lengths and translating the phase differences into spacing parameters $x_{mnk}$, $y_{mnk}$, $z_{mnk}$; or measuring the phase differences electronically and then translating the phase differences into spacing parameters $x_{mnk}$, $y_{mnk}$, $z_{mnk}$. Next, the frame operator G is formed, inverted and applied to the array frame to compute the dual frame $\{B_{mnk}\}$ (or a pseudo-inverse of a matrix formed by array frame functions is carried out as specified before step 30) and finally, the array controlling weights $w_{mnk}=\langle F(\theta, \phi), B_{mnk}\rangle$ are determined from the dual frame $\{B_{mnk}\}$ and a desired system radiation pattern F(θ, φ).

A preferred generating function for desired radiation pattern F(θ, φ) at sampling angles is $$F(\theta,\phi) = 10^{\exp\left(\frac{\theta^8}{\sigma_1^2} - \frac{\phi^8}{\sigma_2^2}\right)}.$$

The followings are some specific applications.

Uniform Planar Array

Figure 3A:
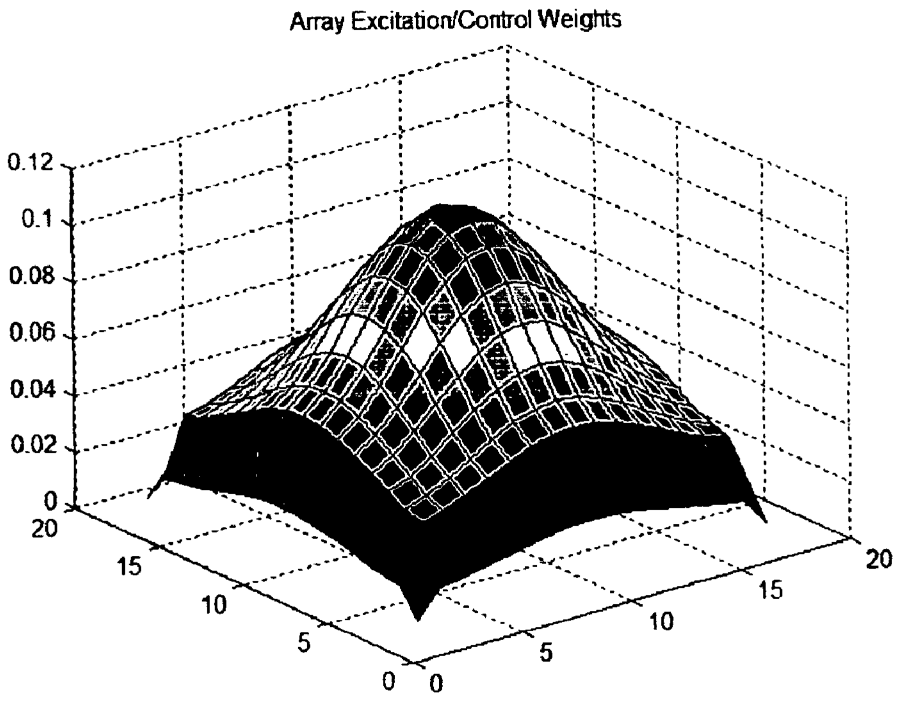
FIG. 3*a* shows a planar array weight control that creates the beam of FIG. 3*b*.
Figure 3B:
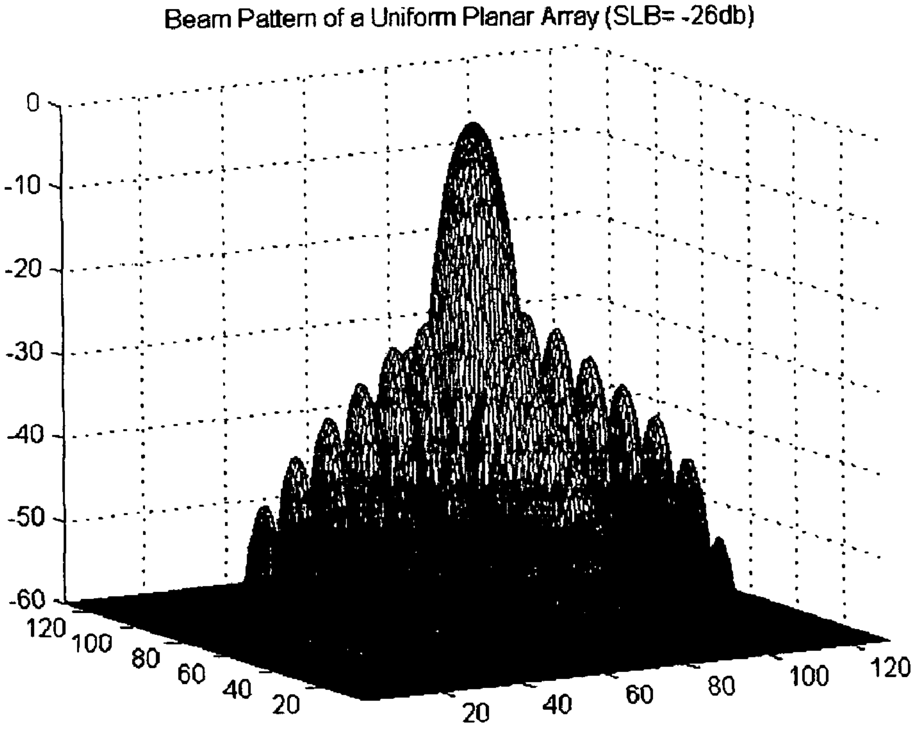
FIG. 3*b* shows a broadside beam pattern using the weights as shown in FIG. 3*a*.

In accordance with the present invention, array parameters are measured. Specifically, the basic element patterns $\rho_{mn0}(\theta, \phi)$ are measured and specified in a constructed array running at the operating frequency. Measured patterns take the mutual coupling into account. Next, element phase differences are measured that translates into actual element spacing. Array frame $\{A_{mn0}\}$ is then formed, and dual frame $\{B_{mn0}\}$ computed. Array control weights $\{w_{mn0}\}$ are then determined. FIG. 3*a* shows the weight matrix $\{w_{mn0}\}$ of a uniformly distributed planar array with half-wavelength spacing. FIG. 3*b* is the corresponding beam patterns in direction cosines. The sidelobe level (SLL) of this particular beam is at about −26 db. Traditional uniformly illuminated (controlled) beam has SLL at about −15 db.

Non-Uniform Planar Array

Figure 4A:
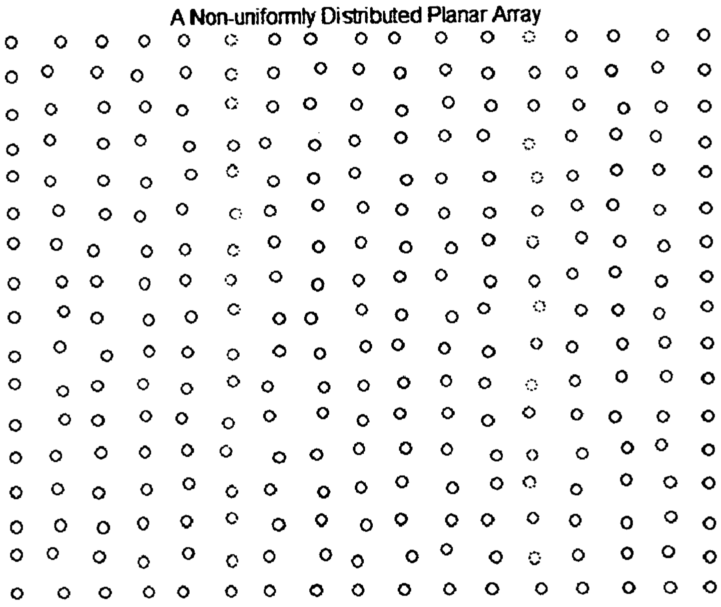
FIG. 4*a* shows a non-uniformly (with a random variation to the uniform array) distributed planar array system. This is an example where non-uniform distribution can be easily compensated.

FIG. 4*a* is a nonuniformly spaced planar array. The spacing variation is clearly visible. One of the advantage of the present invention is that element spacing needs no longer be made mechanically precise. Array control weights will compensate the spacing variations, together with mutual couplings and other factors. As specified in uniform arrays, array parameters are measured first which includes the actual phase differences between and among elements. Actual spacing information is therefore determined. The determination of a dual frame $\{B_{mn0}\}$ will then take spacing variations and mutual coupling into consideration. Array control weights $\{w_{mnk}\}$are therefore reflecting such spacing variations.

Figure 4B:
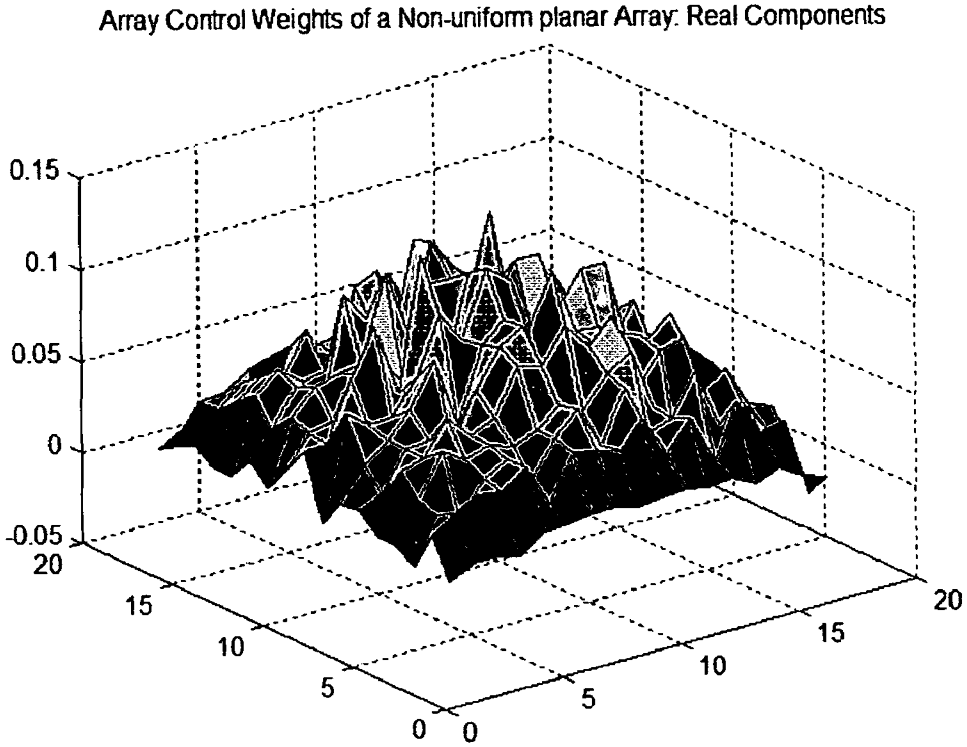
FIGS. 4*b*-4*c* show, respectively, the real and imaginary components of the weight control that naturally compensates the nonuniform distribution of the elements in FIG. 4*a*. The irregularity of the weight matrix is exactly what needed to compensate the non-uniform placement of the array.
Figure 4C:
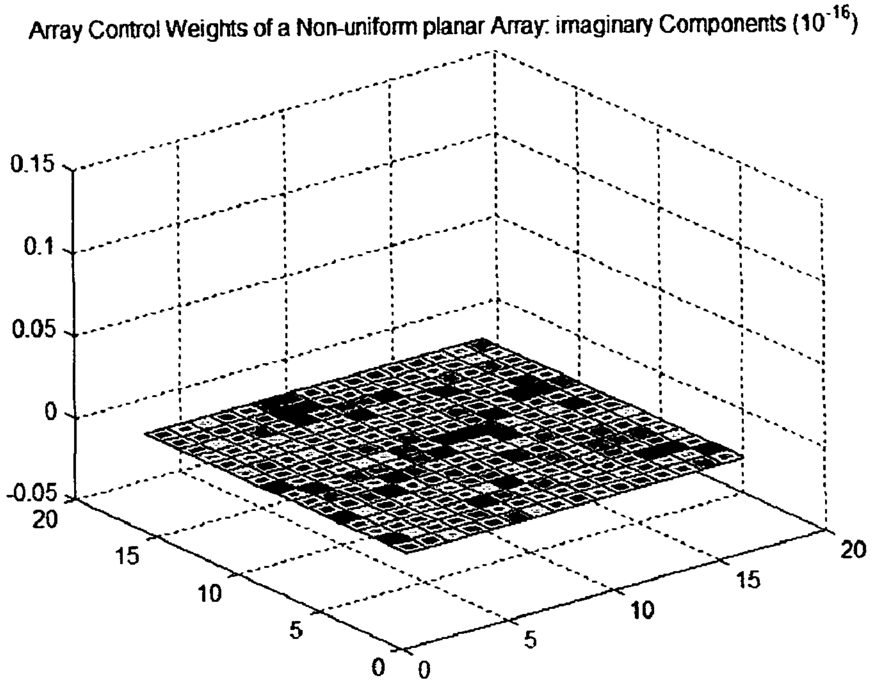

FIGS. 4*b*-4*c* are the real and imaginary (the imaginary is practically zero at the magnitude of $10^{-16}$) components of the array control weights, respectively. The giggly behavior of the weights (FIG. 4*b*) reflects exactly the spacing variation, necessary for producing high beam qualities. No existing construction method can handle such issues precisely.

Figure 4D:
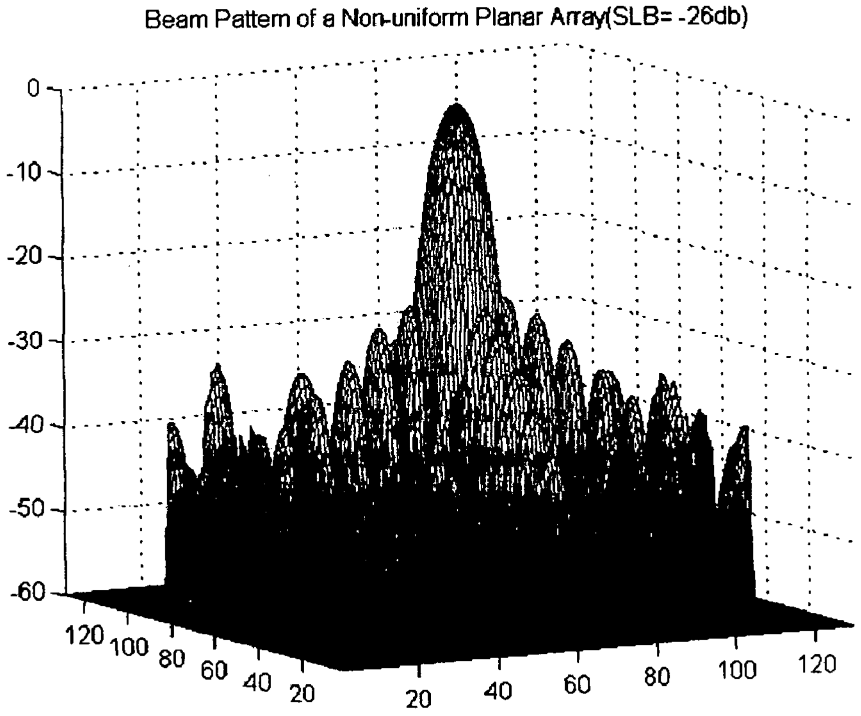
FIG. 4*d* shows the result of the beam pattern. The result of the compensation through weight variations preserves almost entirely the original beam pattern of the uniform array (see FIG. 3*b*), although the far-side sidelobes (below −40 db) are higher. Main beam is identical to the uniform array.

FIG. 4*d* is the resulting beam pattern. The main beam is clearly unchanged. Some slight increase of far-side sidelobes can be detected. Beam quality is clearly high.

Array with Element Gain Variations

Figure 5A:
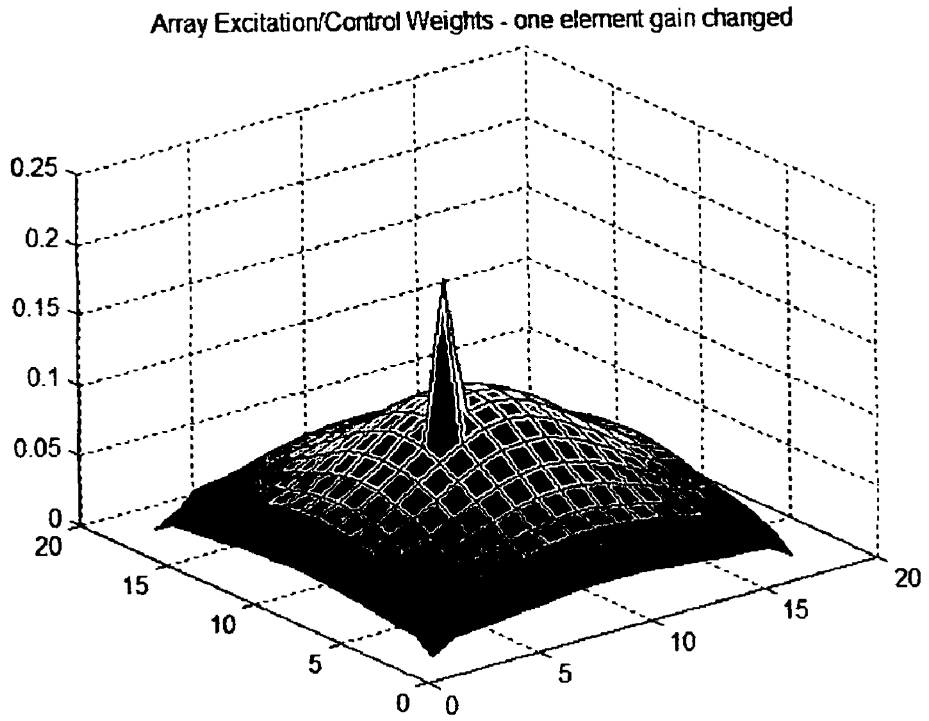
FIG. 5*a* shows a weight control matrix that compensates element gain changes.
Figure 5B:
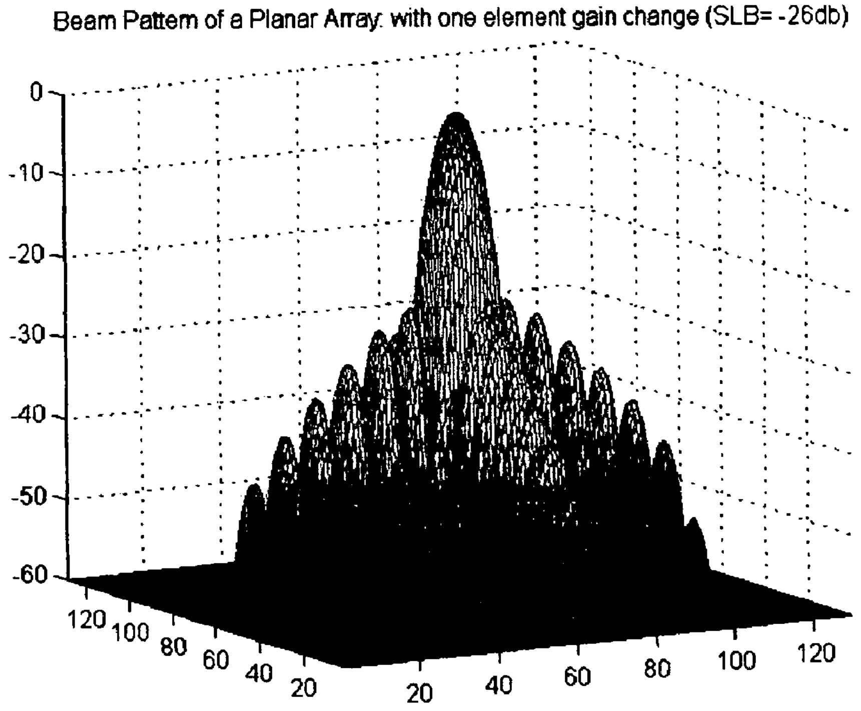
FIG. 5*b* shows the resultant beam pattern of a planar array with element gain changes and compensated with corresponding weight control as shown in FIG. 5*a*.

In practical antenna constructions, element characteristics can never be identical as we wished for. In accordance with the present invention, element patterns $\rho_{mn0}(\theta, \phi)$ is actually measured. Gain variations is therefore reflected. Showing in FIG. 5*a* is the array control weights of an application where some element gain is notably different. The difference is reflected in the weights, and the resulting beam pattern FIG. 5*b* is exactly the same as though all elements are identical (compare with FIG. 3*b*).

Larger Arrays for Enhanced Beam Width/Directivity

Figure 6A:
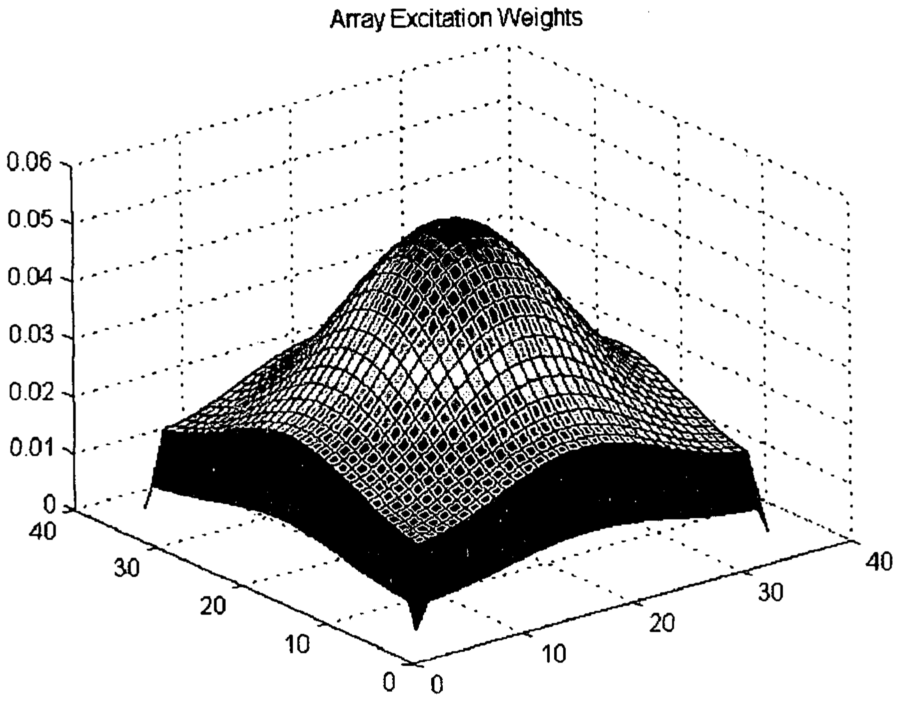
FIG. 6*a* is an example of the weight control matrix a larger planar array.
Figure 6B:
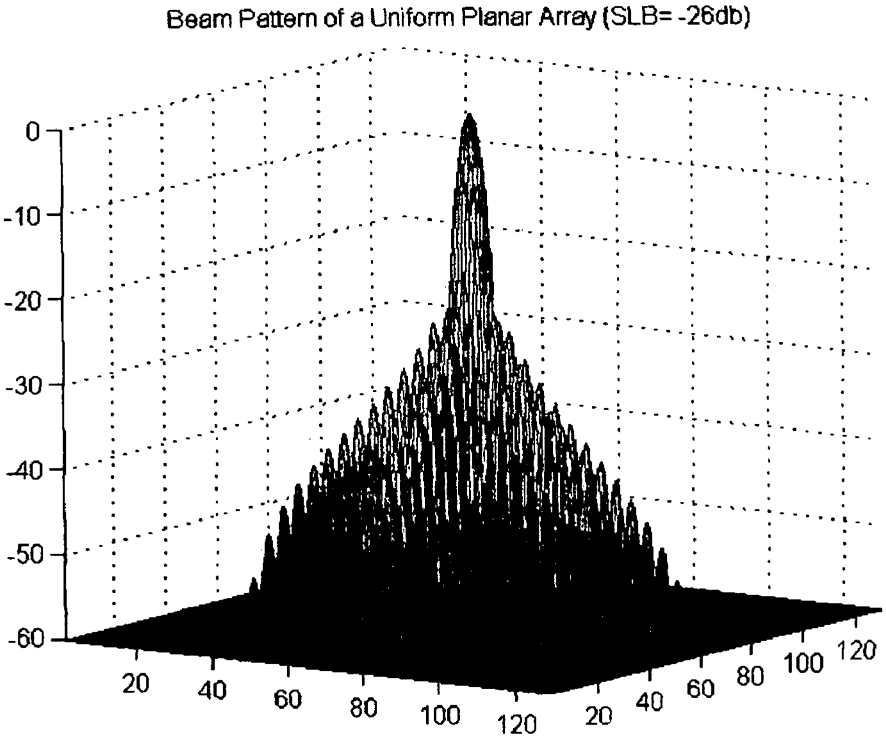
FIG. 6*b* shows the corresponding much narrower beam pattern created by the larger array with weights shown in FIG. 6*a*.

Showing in FIGS. 6*a* and 6*b* are the array control weights and corresponding beam patterns of a larger array, where the beam width or directivity is clearly much better.

Uniform Cylindrical Array

Figure 7A:
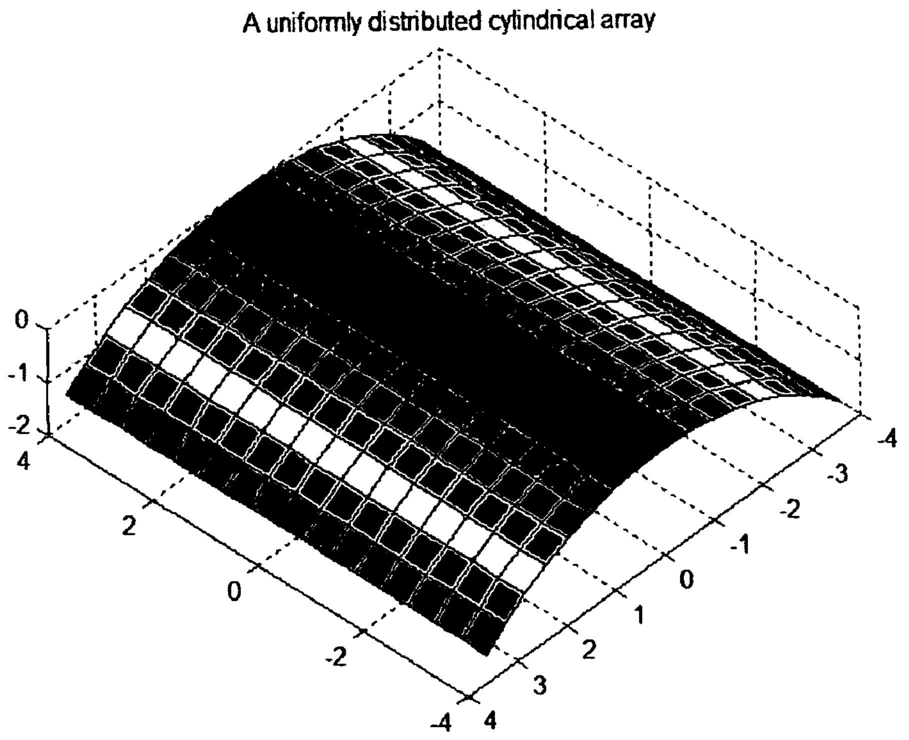
FIG. 7*a* depicts a uniformly distributed cylindrical array uniformly distributed on the surface of a cylinder of radius 5.093λ.
Figure 7B:
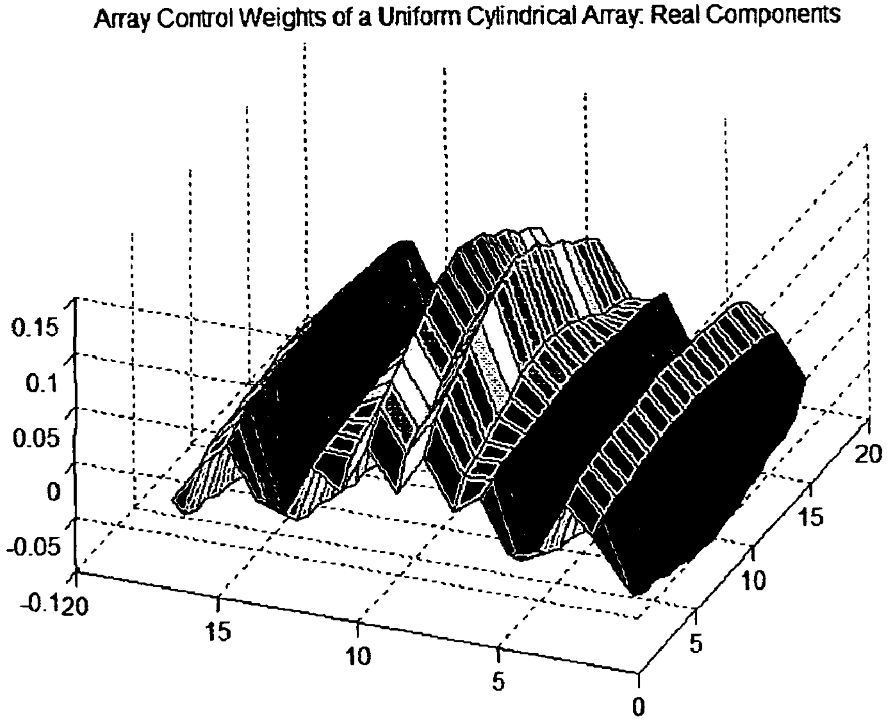
FIGS. 7*b*-7*c* are associated weight control matrix in real and imaginary part, respectively, using this invention.
Figure 7C:
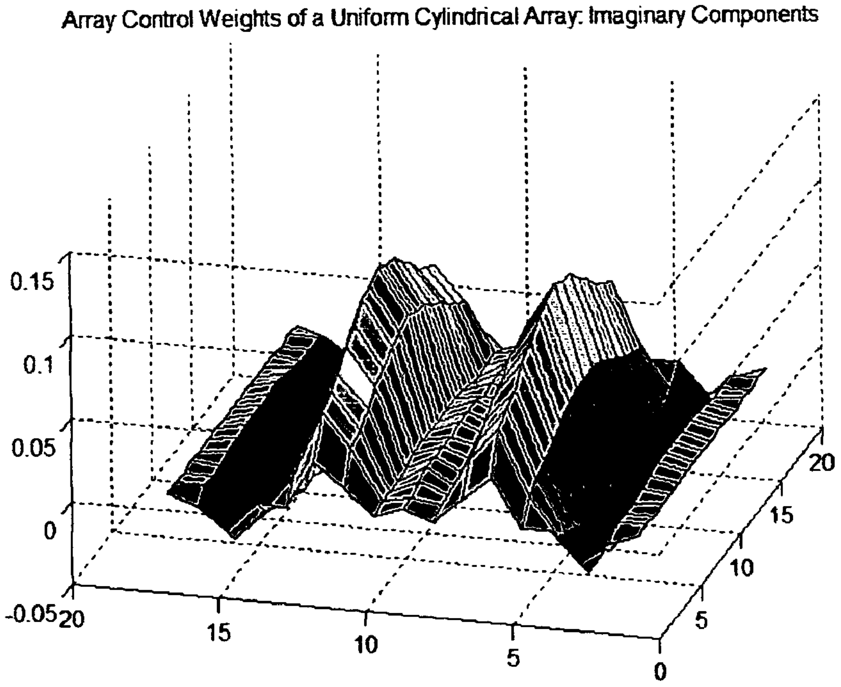
Figure 7D:
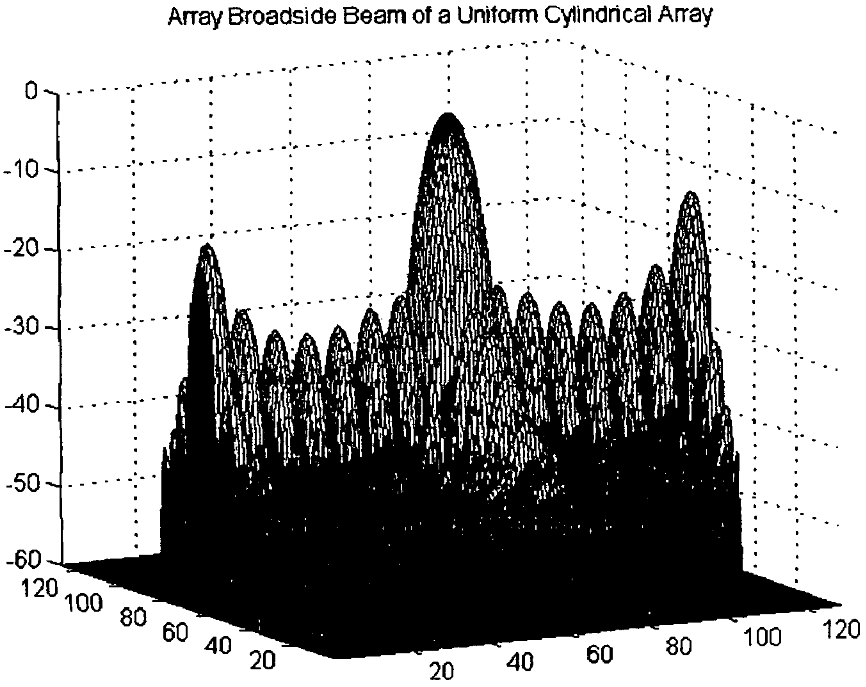
FIG. 7*d* shows the corresponding beam pattern using the invented method and so generated weight control as shown in FIGS. 7*b*-7*c*.

Showing in FIG. 7*a* is a uniformly distributed cylindrical array with half-wavelength spacing. Array parameters are first measured in accordance with the present invention. FIGS. 7*b*-7*c* are the real and imaginary array control weights, respectively. The weight determination is precise and highly non-trivial, in accordance to the present invention. No such weight matrix has been seen in literature. FIG. 7*d* is the corresponding beam pattern.

Non-Uniform Cylindrical Array

Figure 8A:
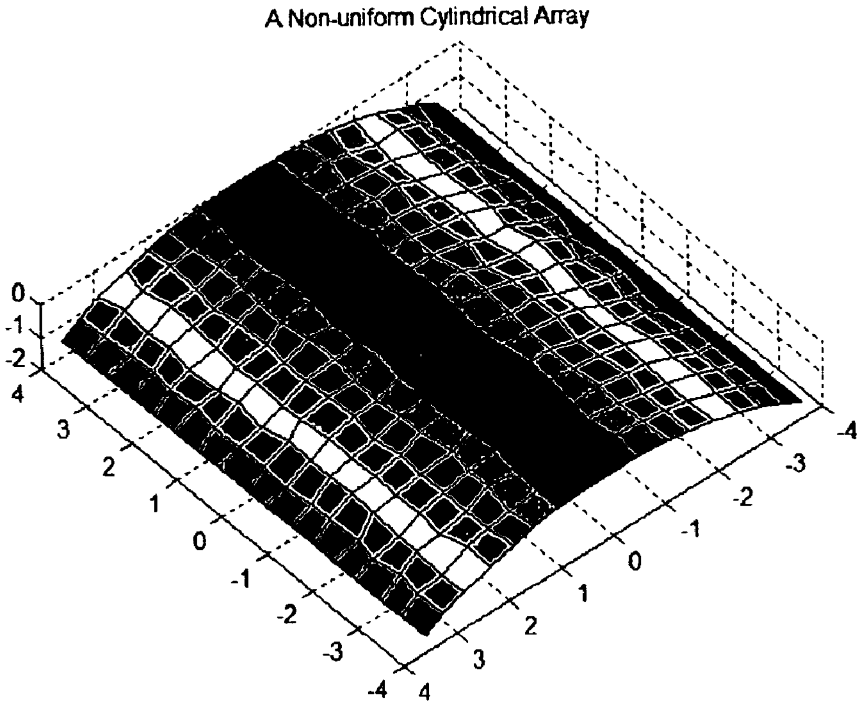
FIG. 8*a* shows an array system non-uniformly distributed on the surface of a cylinder of radius 5.093λ.
Figure 8B:
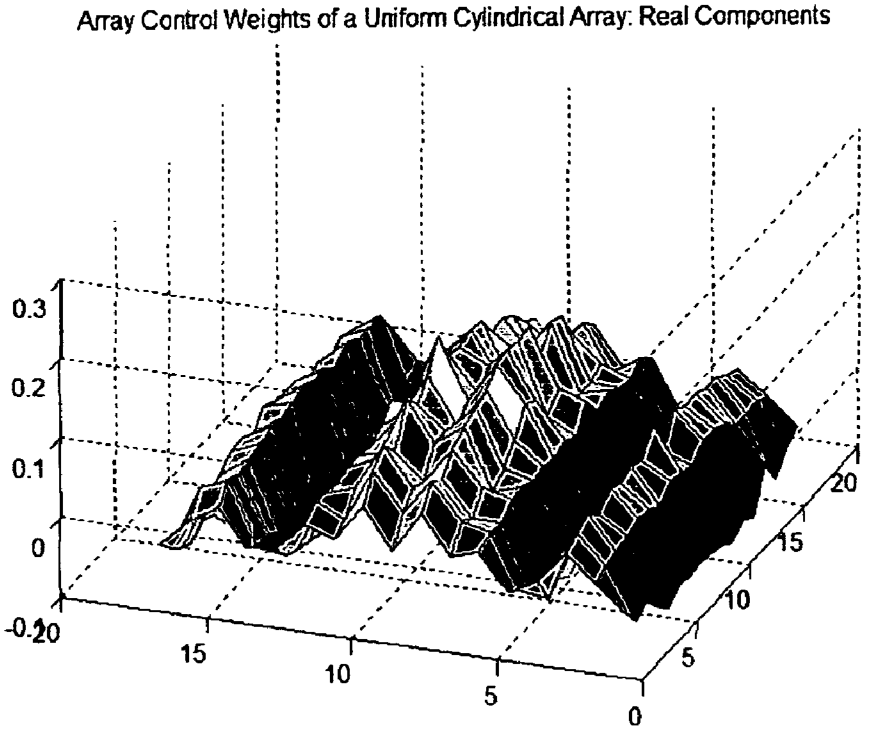
FIGS. 8*b*-8*c* are the compensated array control weight matrix in real and imaginary part, respectively. The irregular modifications to the weight matrix demonstrate the robustness of this invented method as the resultant beam pattern is kept largely unchanged (see FIG. 8*d*).
Figure 8C:
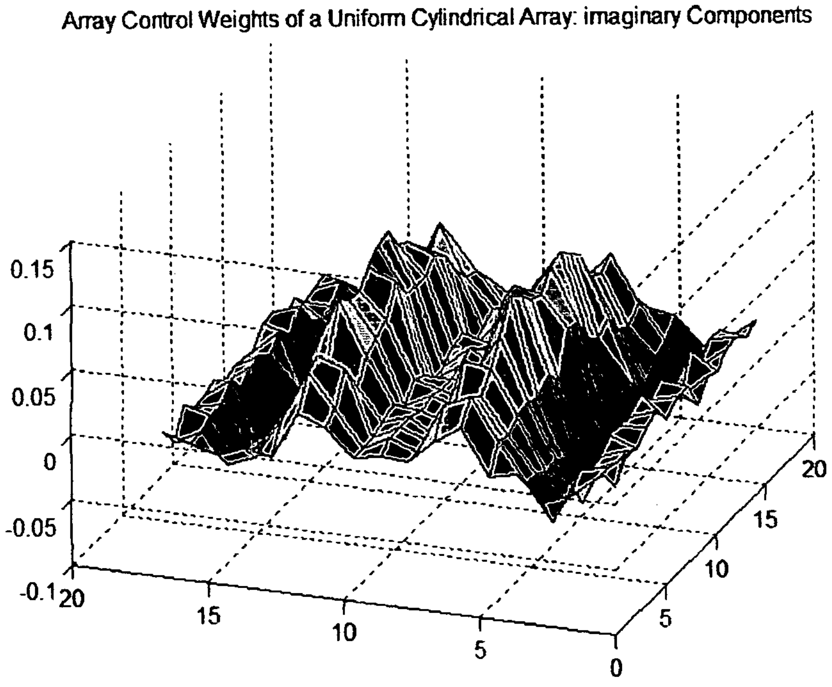
Figure 8D:
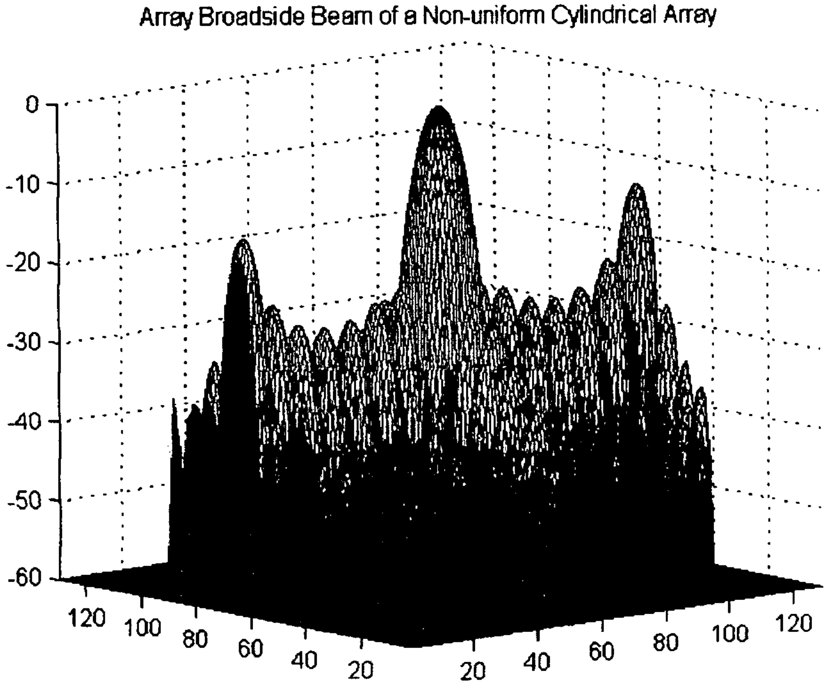
FIG. 8*d* shows the corresponding beam pattern compensated using the invented method and weights as given in FIGS. 8*b*-8*c*.

To demonstrate the advantage of the present invention, a non-uniform cylindrical array application is showing in FIGS. 8*a*-8*d*. FIG. 8*a* shows the non-uniform array distributed on the surface of a cylinder. The spacing variation is random. The present invention creates the control weights as shown in FIGS. 8*b*-8*c*. The giggly behaviors of the weights, both in real and imaginary components, is exactly necessary to compensate the element spacing variation. The resulting beam pattern FIG. 8*d* is clearly of superb quality because of the compensation provided.

Figure 9:
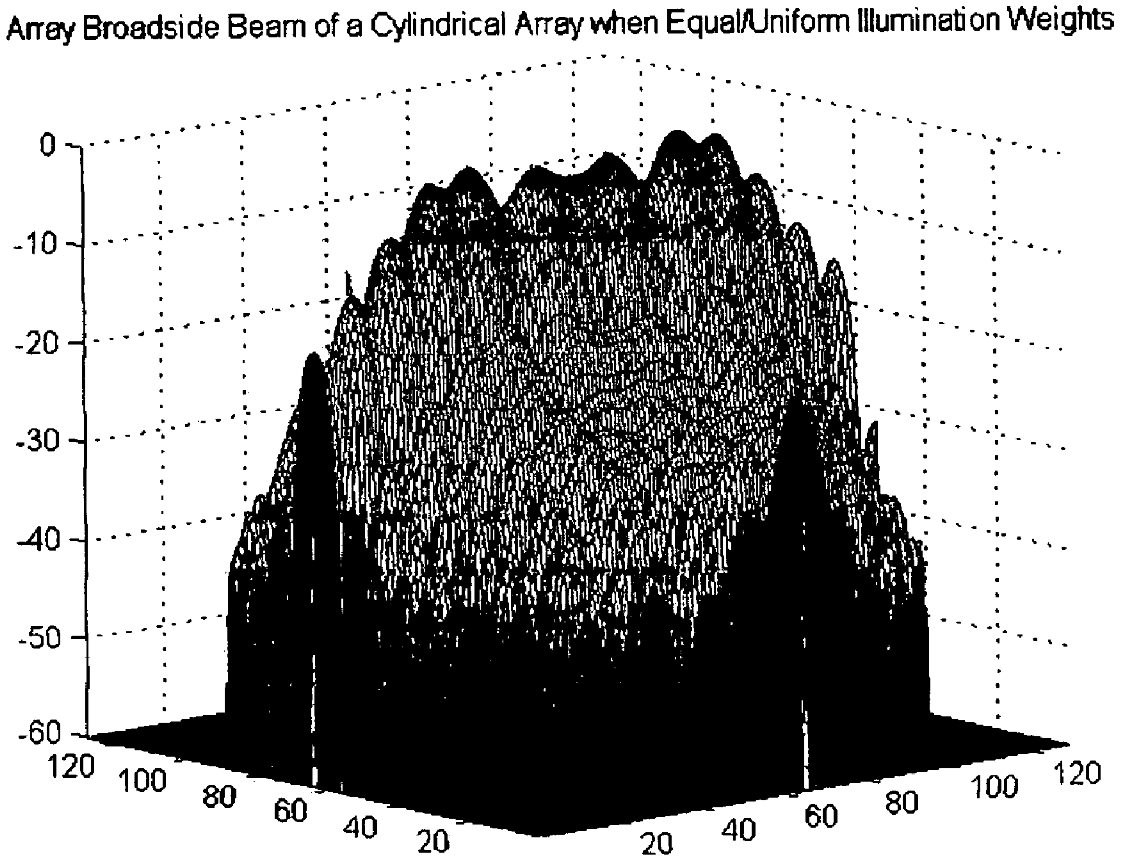
FIG. 9 shows the would-be beam pattern if the cylindrical array as shown in FIG. 7*a* is synthesized using conventional uniform/equal magnitude weights. The quality of the beam is clearly restricted.

If a cylindrical array (uniform) is illuminated/controlled by equal magnitude weights, as is done traditionally, the beam pattern would be seen in FIG. 9, which is clearly of limited quality.

Spherical and Truncated Conical Array Systems

Figure 10:
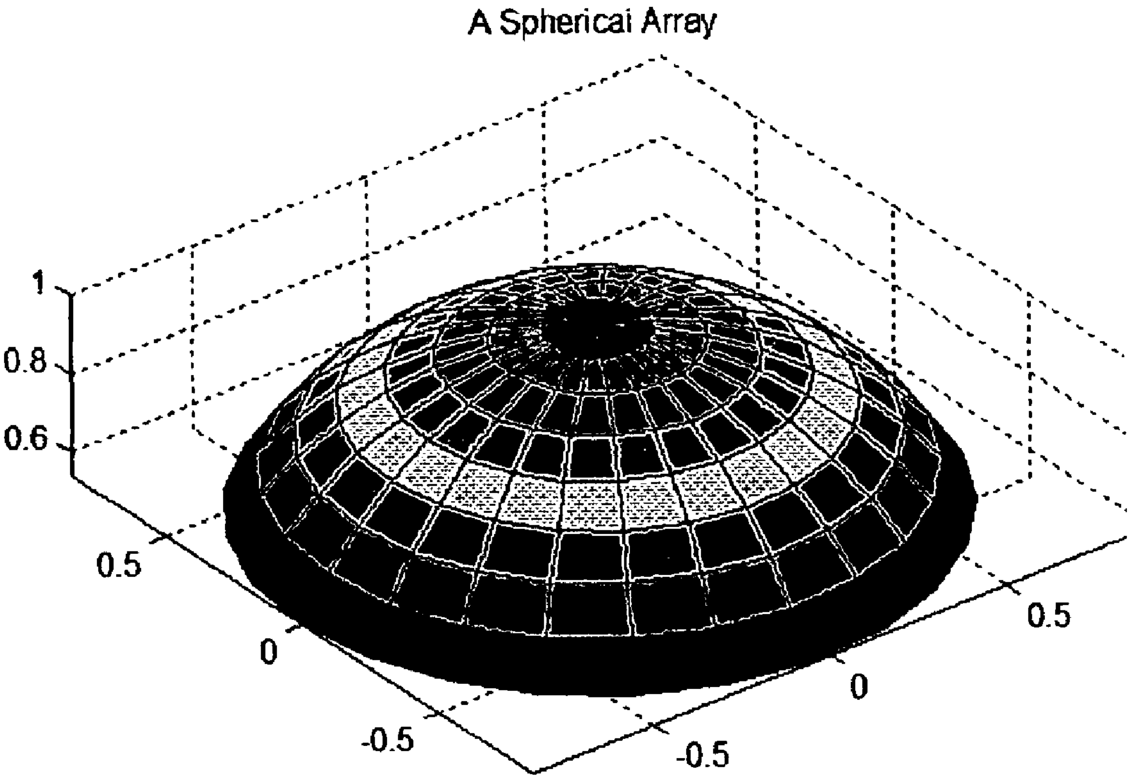
FIG. 10 shows a sector-spherical array.

In accordance with the present invention, array systems built on the surface of a sphere or sectional sphere such as FIG. 10 and truncated conical surface are constructed similarly by first measuring the array parameters, forming the array frame $\{A_{mnk}\}$ and the calculating a dual array frame $\{B_{mnk}\}$, followed by the weight evaluation.

Although the present continuation invention has been described in considerable detail with reference to certain preferred versions thereof, other versions are possible. Therefore, the spirit and scope of the appended claims should not be limited to the description of the preferred versions contained herein.

What is claimed is:

1. A method for constructing an array antenna system from a plurality of antenna elements on an array of any geometry, the method comprising:

specifying an antenna system radiation pattern function that describes the transmission or reception pattern of the antenna system;

determining an element radiation pattern function for each element of the antenna system, each element radiation function including a basic element pattern specification, a frequency of operation and the spacing parameters of an element that specify the location of the element in the antenna system;

determining a set of values for the spacing parameters of an element;

forming a set of functions whose elements are the element radiation pattern functions together with the element spacing parameters and imposing a condition on the elements of the set such that the set of functions is identifiable as a first frame;

determining a second frame that is a dual of the first frame, the second frame having an equal number of elements as the first frame;

determining an element weight coefficient for each antenna element based on the elements of the second frame and the specified antenna system radiation pattern function; and constructing the antenna system from the plurality of antenna elements according to the set of spacing parameters and determined element weight coefficients for each element at the frequency of operation wherein the array antenna system is a three dimensional (3D) array of antenna elements; and wherein the value of the spacing parameter of each dement causes the spacing between adjacent elements of the 3D array to be uniform or non-uniform.

2. A method for constructing an array antenna system as recited in claim 1, wherein the antenna elements are positioned to form a spherical or sectional-spherical array; and wherein the value of the spacing parameter of each element causes the spacing between adjacent element of the spherical or sectional-spherical array to be substantially uniform.

3. A method for constructing an array antenna system as recited in claim 1, wherein the antenna elements are positioned to form a spherical or sectional-spherical array; and wherein the value of the spacing parameter of each element causes the spacing between adjacent dement of the spherical or sectional-spherical array to be non-uniform.

4. A method for constructing an array antenna system as recited in claim 1, wherein the antenna elements are positioned to form a cylindrical or sectional-cylindrical array; and wherein the value of the spacing parameter of each element causes the spacing between adjacent element of the cylindrical or sectional-cylindrical array to be substantially uniform.

5. A method for constructing an array antenna system as recited in claim 1, wherein the antenna elements are positioned to form a cylindrical or sectional-cylindrical array; and wherein the value of the spacing parameter of each element causes the spacing between adjacent dement of the cylindrical or sectional-cylindrical array to be non-uniform.

6. A method for constructing an array antenna system as recited in claim 1, wherein the antenna elements are positioned to form a truncated conical or sectional-truncated conical array; and wherein the value of the spacing parameter of each element causes the spacing between adjacent element of the truncated conical or sectional-truncated conical array to be substantially uniform.

7. A method for constructing an array antenna system as recited in claim 1, wherein the antenna elements are positioned to form a truncated conical or sectional-truncated conical array; and wherein the value of the spacing parameter of each element causes the spacing between adjacent element of the truncated conical or sectional-truncated conical array to be non-uniform.

8. A method for constructing an array antenna system as recited in claim 1, wherein the antenna elements are positioned to form a combined multi-faced array of several sectional arrays; and wherein the value of the spacing parameter of each elements in all sectional arrays determines spacing distribution, be it uniform or non-uniform, of the element in the combined multi-faced array.

9. A method for forming a beam for an antenna system that includes a plurality of antenna elements, the method comprising:

specifying an antenna system radiation pattern function that describes the transmission or reception beam of the antenna system;

determining an element radiation pattern function for each element of the antenna system, each element radiation pattern function including a basic element pattern specification, a frequency of operation and a set of spacing parameters that specify the locations of the element in the antenna system;

determining a value for a set of spacing parameters;

forming a set of functions whose elements are the element radiation pattern functions and the set of spacing parameters and imposing a condition on the elements of the set such that the set of functions is identifiable as a first frame;

determining a second frame that is a dual of the first frame, the second frame having an equal number of elements as the first frame;

determining an element weight coefficient for each antenna element based on the elements of the second frame and the specified antenna system radiation pattern function, the weighted and spaced-apart element radiation patterns combining to make the specified beam wherein the steps for determining element weight coefficients includes; representing the second frame as a matrix and the system radiation pattern function as an expanded (from two dimensional) vector, and computing an inner product of the second frame matrix and the antenna system radiation pattern vector.

10. A method for forming a beam for an antenna system as recited in claim 9, wherein the antenna system radiation pattern is sampled at a number of sampling angles; and wherein the antenna system radiation pattern vector includes a number of elements, the number of vector elements depending on the number of sampling angles.

11. A method for forming a beam for an antenna system as recited in claim 9, wherein the step of representing the second frames as a matrix includes:

representing the first frame as a matrix;

computing a frame operator based on the first frame matrix;

determining the inverse of the frame operator; and computing the second frame based on the inverse of the frame operator and the first frame matrix.

12. A method for forming a beam for an antenna system as recited in claim 11, wherein the step of representing the second frames as a matrix includes computing a pseudo-inverse of the first matrix.

13. A method for forming a beam for an antenna system as recited in claim 9, wherein each antenna element has a relative phase difference associated therewith to account for any physical (cable length) differences relating to the element; and wherein the relative phase difference is translated to spacing differences and included in the values of the spacing parameter of each element.

14. A method for forming a beam for an antenna system as recited in claim 9, wherein at least one element radiation pattern is different from the element radiation patterns of the other elements.

15. A method for forming a beam for an antenna system as recited in claim 9, wherein the values of the set of spacing parameters of each element provide for uniform spacing among the antenna elements.

16. An antenna system and a software tool having a beam formed in accordance with the steps of claim 9.

17. A method for forming a beam for an antenna system as recited in claim 9, wherein one or more of the antenna elements has an element radiation pattern function that is substantially different from the other antenna elements due to a complete or partial failure of the one or more elements.

18. A method for forming a beam for an antenna system that includes a plurality of 3D array systems in a composite array, the method comprising:

specifying a composite antenna system radiation pattern function that describes the transmission or reception of a first and second, antenna system, at a specified frequency of operation;

obtaining a first antenna system radiation pattern function that describes the transmission or reception pattern of a first antenna system at the specified frequency of operation;

obtaining a second antenna system radiation pattern function that describes the transmission or reception pattern of a first antenna system at the specified frequency of operation;

viewing each antenna system and its associate individual system radiation function as a virtual element and associated radiation function in the composite 3D array system; and determining a value of the spacing of these virtual elements, be it uniform or non-uniform, in the composite 3D array system by the virtual centers of all virtual elements;

forming a set of functions whose elements are the first and second antenna system radiation patterns together with spacing values and imposing a condition on the elements of the set such that the set is identifiable as a first frame;

determining a second frame that is a dual frame of the first frame; and determining an element weight coefficient for each virtual element in the composite system based on the second frame and the specified composite antenna system radiation pattern function, the weighted and spaced-apart virtual element radiation patterns combining to make the composite antenna system radiation pattern.

19. An antenna system and a software tool having a beam formed in accordance with the steps of claim 18.

* * * * *